No. 744,989. PATENTED NOV. 24, 1903.
D. L. WINTERS.
GALVANIC BATTERY.
APPLICATION FILED OCT. 5, 1903.
NO MODEL.
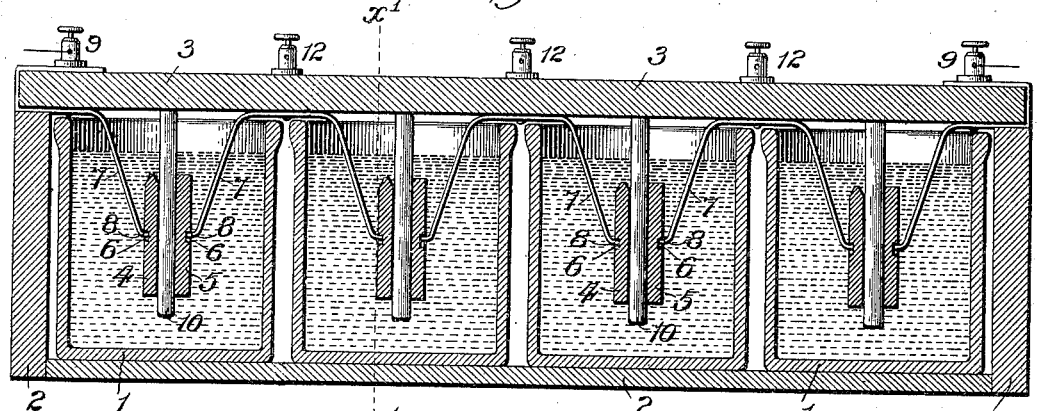
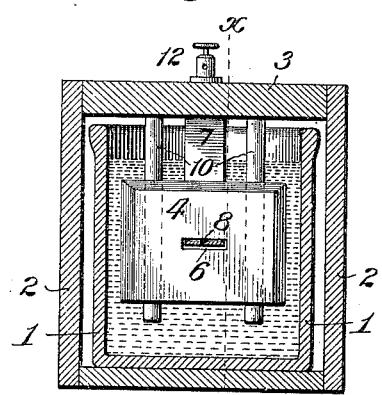
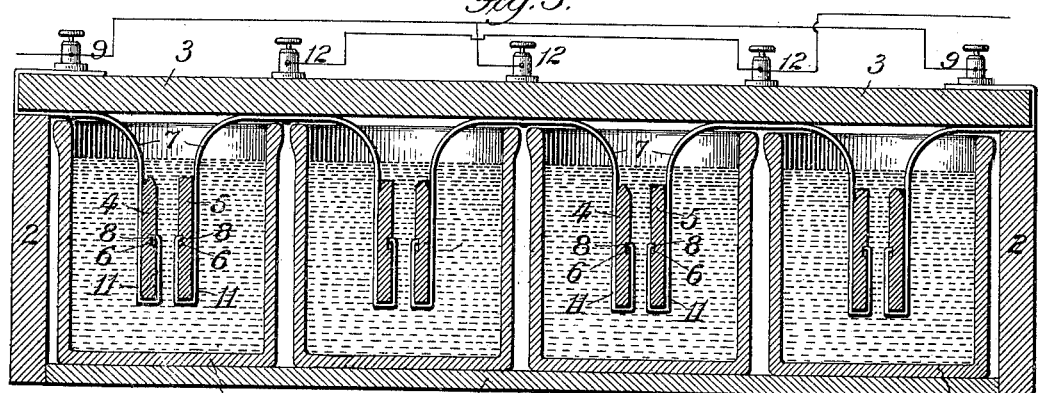
Attest:
John Enders
M. H. Holmes
Inventor:
David L. Winters,
by Robert Burns
Att'y No. 744,989. Patented November 24, 1903.

UNITED STATES PATENT OFFICE.

DAVID L. WINTERS, OF CHICAGO, ILLINOIS, ASSIGNOR OF ONE-HALF TO THEODORE W. SNOW, OF CHICAGO, ILLINOIS.

GALVANIC BATTERY.

SPECIFICATION forming part of Letters Patent No. 744,989, dated November 24, 1903.

Application filed October 5, 1903. Serial No. 175,746. (No model.)

*To all whom it may concern:*

Be it known that I, DAVID L. WINTERS, a citizen of the United States of America, and a resident of Chicago, in the county of Cook and State of Illinois, have invented certain new and useful Improvements in Galvanic Batteries, of which the following is a specification.

The present invention relates to galvanic batteries of the multiple-cell type, and more especially to that type of such batteries which forms the subject-matter of my prior Letters Patent, No. 734,646, dated July 28, 1903; and the present improvement has for its object to provide a simple and efficient structural arrangement and combination of parts by means of which the positive and negative electrodes can be connected in series to increase the amperage with but little change in the terminal line connections, all as will hereinafter more fully appear, and be more particularly pointed out in the claims.

In the accompanying drawings, illustrative of the present invention, Figure 1 is a longitudinal sectional elevation at line $x\ x$, Fig. 2, of a battery to which the present invention is applied and in which the battery is connected in series. Fig. 2 is a transverse sectional elevation of the same at line $x'\ x'$, Fig. 1. Fig. 3 is a longitudinal sectional elevation of a modification, showing the battery connected in multiple.

Similar numerals of reference indicate like parts in the different views.

Referring to the drawings, 1 represents a series of individual battery-cells of any usual form and material, 2 a containing-box for the cells, and 3 a removable cover therefor.

4 represents the series of positive electrodes, and 5 the companion series of negative electrodes, the preferred form of which is that of a rectangular flat plate, as shown, and provided with recesses or depressions 6, for the purpose hereinafter stated.

7 represents supporting-holders for the aforesaid electrodes and formed of strips of metal or other suitable conductive material. In the preferred form of the present invention, as shown in the drawings, such holders are secured to the under side of the removable cover 3 of the battery casing or box 2 and depend down into the battery-cells 1, with their lower and free ends provided with angular lips or flanges 8, adapted to engage in the before-described recesses or depressions 6 in the electrodes to maintain said electrodes in proper position within the cells, and yet permit of a ready detachment of any particular electrode when required.

As in my former patented construction, the supporting-holders at the respective ends of the battery will be of the single form shown and will have binding or terminal posts 9 for the convenient connection of the line conductors.

The series of supporting-holders may be formed of a resilient material, as in my former patented construction, and adapted to contact one with the other in any particular cell with a removal of the electrodes from such cell to form a short or metallic circuit across such cell and preserve the main circuit of the battery from interruption. With such arrangement spacing rods or bars 10, depending from the aforesaid cover 3, as shown in Figs. 1 and 2, are used to hold the different pairs of electrodes in separated relation and, in addition, form abutments against which such electrodes are held by the resilient supporting-holders aforesaid. The scope of the present invention involves, however, the employment of supporting-holders which are non-resilient and simply support the electrodes in proper position within the cells in order to meet the varied requirements arising in the application of the present invention to different forms of batteries, which may involve the positioning of the opposed pairs of such supporting-holders either out of alinement or so far apart as to prevent the before-described contact with each other in the absence of the electrodes from between the same. In the preferred construction of such supporting-holders, as illustrated in Fig. 3 of the drawings, the depending portion of each holder will be bent upon itself to form a receiving-pocket 11 for its electrode and with an inturned lip or angular flange 8 at its free end for engagement in the recess or depression 6 of such electrode, as in the first-described construction.

12 represents a series of binding-posts electrically connected with and individual to the series of intermediate supporting-holders, the purpose of which is to enable any particular holder or holders, with their electrodes and containing-cells, to be cut out of the main battery-circuit where circumstances indicate a change in the electromotive force of the battery or where a particular cell or cells may become disabled and to admit of one half of the holders being connected to the positive line-wire, while the other half would be connected to the negative line-wire when connecting the electrodes in multiple, as shown in Fig. 3.

Having thus fully described my said invention, what I claim as new, and desire to secure by Letters Patent, is—

1. In a galvanic battery, the combination of a series of battery-cells, positive and negative electrodes therein, a series of double-electrode holders adapted to connect and support two electrodes in adjacent cells, and means to connect the same to the line conductors, substantially as specified.

2. In a galvanic battery, the combination of a series of battery-cells, positive and negative electrodes therein, single-electrode holders adapted to connect with the line-wires, and double-electrode holders arranged intermediate of the single holders and adapted to hold and support two electrodes in adjoining cells, substantially as specified.

3. In a galvanic battery, the combination of a series of battery-cells, positive and negative electrodes therein, single-electrode holders adapted to connect with the line-wires, double-electrode holders arranged intermediate of the single holders and adapted to support two electrodes in adjoining cells, and means to electrically connect the double and single electrode holders together and to the line-wires, substantially as specified.

4. In a galvanic battery, the combination of a series of battery-cells, interchangeable positive and negative electrodes therein, single-electrode holders adapted to connect with the line-wires, double-electrode holders intermediate of the single holders and adapted to support two electrodes in adjoining cells, and means to electrically connect the double and single electrode holders together and to the line-wires, substantially as specified.

5. In a galvanic battery, the combination of a series of battery-cells, single-electrode holders adapted to connect with the line-wires and provided with angular projections at their free ends, double-electrode holders arranged intermediate of the single holders and provided with angular projections at their free ends, and positive and negative electrodes provided with depressions for engagement with the angular projections aforesaid, substantially as specified.

6. In a galvanic battery, the combination of a series of battery-cells, single-electrode holders adapted to connect with the line-wires and provided with angular projections at their free ends, double-electrode holders arranged intermediate of the single holders and provided with angular projections at their free ends, positive and negative electrodes provided with depressions for engagement with the angular projections aforesaid, and means to electrically connect the single and double electrode holders with each other and with the line-wires, substantially as specified.

7. In a galvanic battery, the combination of a series of battery-cells, positive and negative electrodes therein, a cover for said cells, and a series of double-electrode holders carried by said cover and adapted to connect and support two electrodes in adjacent cells, substantially as specified.

8. In a galvanic battery, the combination of a battery-cell, electrode-holders provided with angular projections at their free ends, and positive and negative electrodes provided with depressions to fit the projections aforesaid, substantially as specified.

Signed at Chicago, Illinois, this 1st day of October, 1903.

DAVID L. WINTERS.

Witnesses:
ROBERT BURNS,
M. H. HOLMES.